(12) United States Patent
Yip

(10) Patent No.: US 7,168,081 B2
(45) Date of Patent: Jan. 23, 2007

(54) DOMAIN STABILIZED MAGNETO-OPTIC HEAD

(75) Inventor: Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 494 days.

(21) Appl. No.: 10/652,278

(22) Filed: Aug. 29, 2003

(65) Prior Publication Data
US 2005/0050568 A1    Mar. 3, 2005

(51) Int. Cl.
*G11B 11/105* (2006.01)
(52) U.S. Cl. ............... 720/658; 360/114.01; 369/13.02
(58) Field of Classification Search ............... 720/658; 360/114.01, 327; 369/13.02
See application file for complete search history.

(56) References Cited

U.S. PATENT DOCUMENTS

| | | | |
|---|---|---|---|
| 3,465,322 A | 9/1969 | Stapper, Jr. | |
| 4,556,925 A * | 12/1985 | Suenaga et al. | ............ 360/327 |
| 4,821,133 A | 4/1989 | Mowry et al. | |
| 5,689,391 A | 11/1997 | Maurice | |
| 5,917,671 A | 6/1999 | Kaaden et al. | |
| 6,084,848 A | 7/2000 | Goto | |
| 6,151,192 A | 11/2000 | Maurice | |
| 6,535,351 B1 * | 3/2003 | Yip et al. | ............ 360/114.01 |

OTHER PUBLICATIONS

Maillot et al., "High track density magneto-optical readout of magnetic tapes," *IEEE Transactions on Magnetics*, vol. 30, No. 2, Mar. 1994, pp. 326-330.

* cited by examiner

*Primary Examiner*—Craig A. Renner
(74) *Attorney, Agent, or Firm*—Eric D. Levinson

(57) ABSTRACT

A magneto-optic head includes a magnetic layer formed to have a substantially stabilized magnetic domain configuration. The magnetic layer includes a set of magnetic domains that includes one or more magnetic domains that are oriented such that they are substantially parallel to a major axis of the magnetic layer. In exemplary embodiments, the magnetic layer is deposited over a non-magnetic substrate and patterned, e.g., etched, in such a way that ordered magnetic domains form within the magnetic layer. For example, the magnetic layer may be patterned to have a height and width-to-height aspect ratio that yields one or more magnetic domains that are oriented such that they are substantially parallel to a major axis of the magnetic layer. In some embodiments, two magnetic layers are antiferromagnetically exchange coupled such that each magnetic layer includes a magnetic domain that is oriented substantially parallel to the major axis of that magnetic layer.

13 Claims, 7 Drawing Sheets

DOMAIN STABILIZED MAGNETO-OPTIC HEAD

TECHNICAL FIELD

The invention relates to magnetic data storage and, in particular, magneto-optic heads for magnetic media.

BACKGROUND

Magnetic storage media, which include magnetic tape and magnetic disks, are commonly used for storage and retrieval of data. The data is typically encoded in magnetizations on the recording surface of the magnetic media. A typical magnetic recording medium includes a thin layer of ferromagnetic material, such as gamma ferric oxide, supported by a non-magnetic substrate. The ferromagnetic material is a material that can be permanently magnetized by the application of an external magnetic field. The ferromagnetic material typically includes magnetic particles mixed with a binder material that can attach to the non-magnetic substrate. The ferromagnetic material is typically applied to the non-magnetic substrate in a coating process. Alternatively, metal evaporation techniques or sputtering techniques can be used to apply the ferromagnetic material on the non-magnetic substrate.

Magneto-optic read techniques have been developed for readout of data stored on magnetic media. Magneto-optic read techniques take advantage of both electromagnetic principles and optics to facilitate data readout. A magneto-optic head can capture fringing magnetic fields produced by the magnetic particles that are encoded with data on the surface of the magnetic media. Polarized light is reflected off the read head, and detected by a light detector such as a linear charged coupled device (CCD). When the light is reflected, a polarization rotation occurs, sometimes referred to as the longitudinal Kerr effect. The polarization rotation is proportional to the magnetization in the read head. Thus, the polarization rotation of the detected light can be interpreted to facilitate readout of the data magnetically encoded in the surface of the magnetic media.

Magneto-optic heads include a ferromagnetic layer that captures fringing magnetic fields produced by magnetic media. Typically, these ferromagnetic layers are unpatterned and include a plurality of magnetic domains, i.e., different regions of the layers in which the magnetic fields of the atoms of the ferromagnetic material are aligned. The location, boundaries, and alignment of magnetic domains within ferromagnetic layers of unconstrained magneto-optic heads are generally random, e.g., the ferromagnetic layers tend to reside in a random multi-domain state. When magnetized by the fringing magnetic fields produced by a magnetic medium, such ferromagnetic layers will respond in a non-uniform manner that depends upon the domain configuration of the portion of the layer that is being magnetized. Such non-uniform cross-medium response impairs the ability of unconstrained magneto-optic heads to accurately read adjacent tracks across a medium.

SUMMARY

In general, the invention is directed toward a magneto-optic head with a magnetic, e.g., ferromagnetic, layer formed to have a substantially stabilized magnetic domain configuration. The magnetic layer includes a set of magnetic domains that includes one or more magnetic domains that are oriented such that they are substantially parallel to a major axis of the magnetic layer. A major axis of the magnetic layer is an axis that is perpendicular to the relative motion of a medium with respect to the head. A magnetic layer whose magnetic domain configuration is substantially stabilized in this manner may display a more uniform cross-medium response than magnetic layers of unconstrained magneto-optic heads.

In exemplary embodiments, the magnetic layer is deposited over a non-magnetic substrate, and patterned, e.g., etched, in such a way that ordered magnetic domains form within the magnetic layer. For example, the magnetic layer may be patterned to have a height and width-to-height aspect ratio that yields one or more magnetic domains that are oriented such that they are substantially parallel to a major axis of the magnetic layer. A magnetic layer height that is less than or equal to twenty micrometers and a width-to-height ratio that is greater than or equal to 2 may yield a substantially stabilized magnetic domain configuration, and a height that is less than or equal to five micrometers combined with a width-to-height ratio that is greater than or equal to four may yield a magnetic layer with a set of magnetic domains that consists of a single predominant magnetic domain that is oriented substantially parallel to the major axis of the magnetic layer. When the magnetic layer is formed, an anisotropic easy axis for the magnetic layer may be set substantially parallel to the major axis, and, consequently, the one or more domains of the magnetic layer may be oriented substantially parallel to the easy axis of the magnetic layer.

In some embodiments, the opposed ends of the magnetic layer that are oriented along the major axis of the magnetic layer are patterned such that their height is less than that of the center portion of the magnetic layer, which may stabilize the magnetic domain configuration of the magnetic layer. In other embodiments, the magnetic layer may be patterned as a closed-loop within which magnetic flux is largely contained. A single substantially closed-loop magnetic domain tends to form within such a closed-loop magnetic layer, and the orientation of the magnetic domain at the portion of the magnetic layer to which light is directed for reading data from a medium can be substantially parallel to a major axis of the closed-loop magnetic layer.

In other embodiments, one or more permanent magnet elements may be added to the magneto-optic head to stabilize the magnetic domain configuration of the magnetic layer. For example, first and second permanent magnet elements may be placed proximate to first and second opposing ends of the magnetic layer along the major axis of the magnetic layer. The permanent magnet elements may be set by a magnetic field such that the magnetic fields of the permanent are oriented substantially parallel to the major axis of the magnetic layer.

In some embodiments, a magneto-optic head includes two magnetic layers that are antiferromagnetically exchange coupled such that each magnetic layer includes a magnetic domain that is oriented substantially parallel to the major axis of that magnetic layer. A non-magnetic layer, such as copper, is deposited over the first magnetic layer, and a second magnetic layer is deposited over the non-magnetic layer. The layers may be patterned to a selected height and width-to-height aspect ratio, as described above.

A series of ferromagnetic exchange breaks may be formed within the layers. The exchange breaks reduce the lateral permeability of magnetic flux through the first and second layers. Consequently, the exchange breaks reduce cross-talk between adjacent segments of the magneto-optic head, i.e., ensure that the magnetic fields for the data regions read by one segment of the magneto-optic head do not corrupt the readout of data regions by another segment of the head. In exemplary embodiments, the ferromagnetic exchange breaks are defined by the absence of magnetic material, i.e., the layers can be etched away to define the ferromagnetic exchange breaks.

In one embodiment, the invention is directed to a magneto-optic head comprising a non-magnetic substrate layer and a magnetic layer formed over the substrate layer. The magnetic layer includes a set of magnetic domains, each magnetic domain of the set oriented substantially parallel with a major axis of the magnetic layer.

In another embodiment, the invention is directed to a method of making a magneto-optic head with a substantially stabilized magnetic domain configuration. The method comprises forming a magnetic layer over a non-magnetic substrate layer such that the magnetic layer includes a set of magnetic domains, each magnetic domain oriented substantially parallel with a major axis of the magnetic layer.

In another embodiment, the invention is directed to a magneto-optic readout system comprising a magneto-optic head, a light source and a light detector. The magneto-optic head includes a non-magnetic substrate layer, and a magnetic layer formed over the substrate layer that includes a set of magnetic domains, each magnetic domain of the set oriented substantially parallel with a major axis of the magnetic layer. The light source illuminates the magnetic layer, and the light detector detects light reflected off the magnetic layer.

In another embodiment, the invention is directed to a magneto-optic head comprising a non-magnetic substrate layer and a magnetic layer formed over the substrate layer. A height of the magnetic layer is less than or equal to twenty micrometers, and a width-to-height aspect ratio of the magnetic layer is greater than or equal to two.

The invention is capable of providing a number of advantages. For example, a magneto-optic read head with a magnetic layer having a stabilized domain configuration may respond to magnetic flux from a magnetic medium more uniformly in the cross-track direction than existing magneto-optic read heads. Consequently, the fidelity of data readout by a magneto-optic read system including such a head may be improved. Magnetic layer embodiments that include a single predominant magnetic domain may also avoid the occurrence of Barkhausen noise, which is caused magnetic domain wall motion during magnetization of the magnetic layer, further improving the fidelity of data readout by a magneto-optic read system.

The inclusion of ferromagnetic exchange breaks in some embodiments may provide further advantages. Reducing cross-talk between the readout of adjacent regions of a medium may facilitate the ability to simultaneously read adjacent data tracks and the ability to read smaller sized data tracks than other magneto-optic read heads. Importantly, as tracks become smaller, data storage densities on the magnetic media increases.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
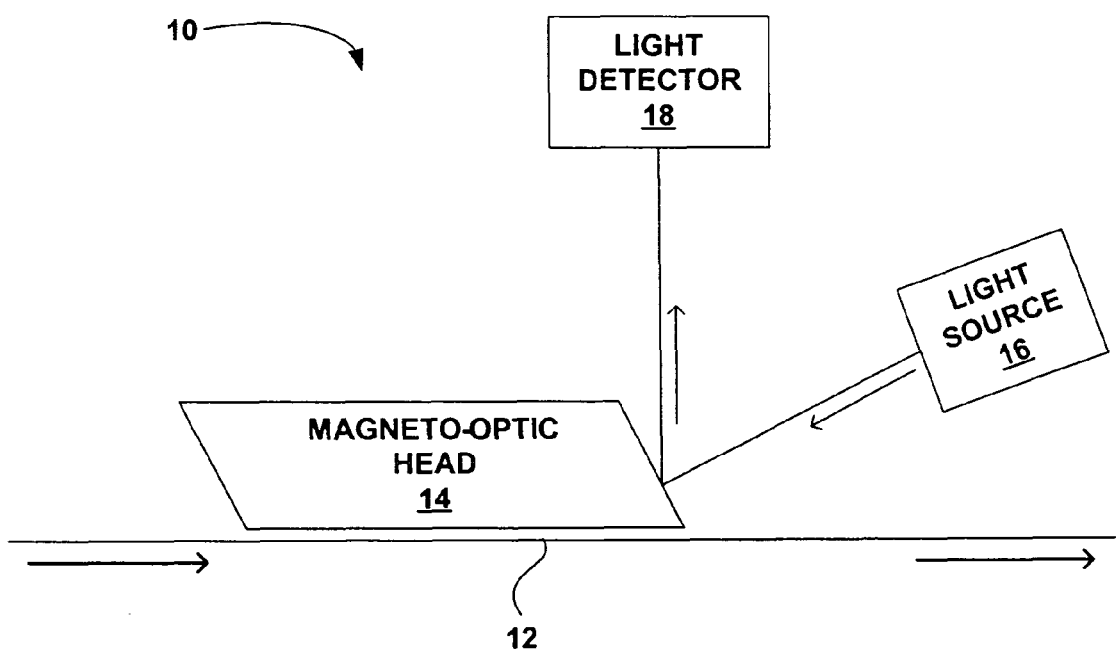
FIG. 1 is a block diagram of a magneto-optic read system according to the invention.

Various aspects of the invention are described in relation to readout of magnetic tape media. The same principles and advantages may be extended for use with other magnetic media, including magnetic disks and the like. FIG. 1 is a block diagram of a magneto-optic read system 10 according to the invention. As shown, magnetic tape 12 passes under magneto-optic head 14 to facilitate readout of data stored on the magnetic tape 12.

Magnetic tape 12 typically includes a number of tracks, each of which has a series of magnetically encoded data regions. The data tracks run longitudinally, i.e., parallel to the direction that the tape feeds. Each magnetically encoded data region within the data tracks may correspond to a bit of information or a number of bits of information. The data regions may be magnetically recorded using one of a variety of different data recording techniques.

System 10 can be used to read data magnetically stored on magnetic tape 12. As tape 12 passes under magneto-optic head 14, the head 14 captures fringing magnetic fields associated with the various data regions in a number of data tracks on magnetic tape 12. In other words, as tape 12 passes under magneto-optic head 14, each of the data regions in a number of the data tracks likewise pass under magneto-optic head 14. In some cases, all of the data tracks of magnetic tape 12 may simultaneously pass under magneto-optic head 14.

System 10 can simultaneously read the data stored in data regions that are spaced transversely across tape 12. In other words, the data stored in each data track on tape 12 is readout at the same time as data stored in other data tracks. To facilitate readout, light source 16 illuminates a region of magneto-optic head 14 typically located near the edge of head 14 with polarized light. The polarized light reflects off head 14 and is detected by light detector 18. For example, light detector 18 may comprise a linear CCD that detects the intensity of a component of reflected polarized light. Alternatively, light detector 18 may comprise a two-dimensional array charged coupled device, a charge injection device, a photomultiplier tube, a photodiode, a complementary metal oxide semiconductor (CMOS), or one or more other light detectors.

When the light from light source 16 is reflected off magneto-optic head 14, a polarization rotation occurs, sometimes referred to as the longitudinal Kerr effect. The polarization rotation angle is proportional to the magnetization in magneto-optic head 14, which in turn depends on the magnetization of magnetic tape 12. This polarization rotation angle can be detected, e.g., via detection of the intensity of a rotated component of reflected polarized light, for each data track in magnetic tape 12. The polarization of the light detected by light detector 18 can be interpreted to facilitate readout of the data magnetically encoded on the surface of magnetic media 12.

Figure 2:
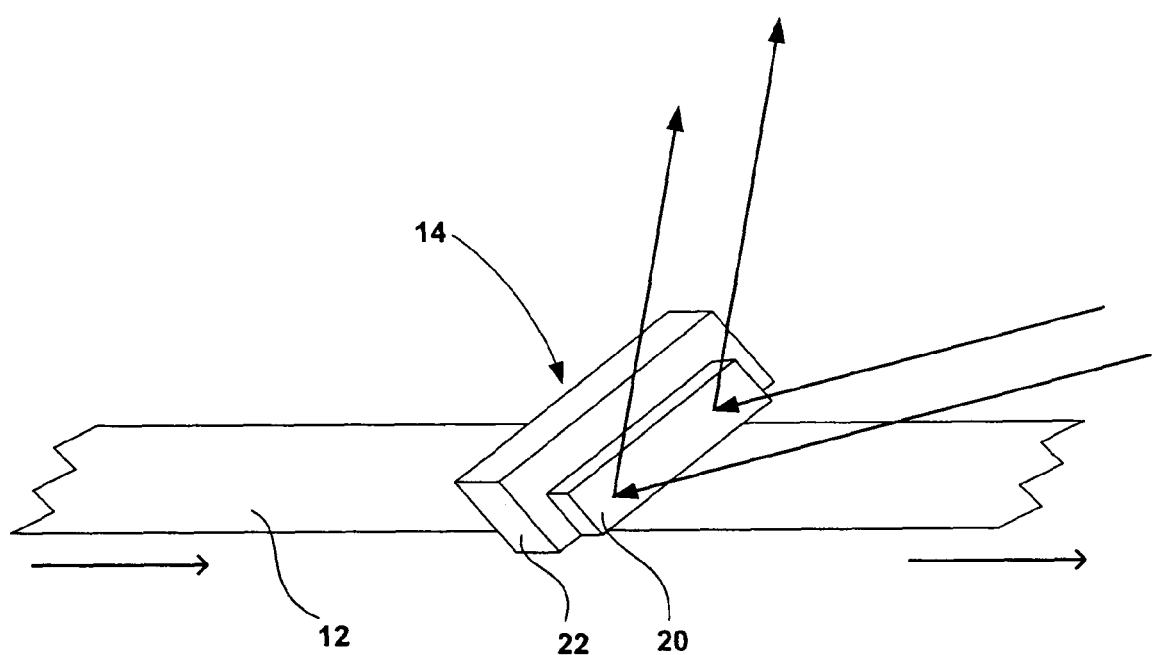
FIG. 2 is a perspective view illustrating magnetic tape passing under the magneto-optic head of the system of FIG. 1.

FIG. 2 is a perspective view illustrating magnetic tape 12 passing under magneto-optic head 14. In the illustrated example, magneto-optic head 14 includes a magnetic layer 20 formed over a non-magnetic substrate 22. Magnetic layer 20 typically comprises a ferromagnetic material with low reluctance. For example, magnetic layer 20 may comprise an alloy with high iron content, such as pure iron or nitrated iron.

As tape 12 passes under head 14, fringing magnetic fields associated with data stored on tape 12 are captured by magnetic layer 20. Light directed toward head 14 by light source 16 (FIG. 1) is reflected by non-magnetic substrate 22 towards light detector 18 (FIG. 1). As the light passes through magnetic layer 20, a polarization rotation proportional to the magnetization of magnetic layer 20 occurs. As indicated above, the polarization rotation of the reflected light is detected and interpreted to facilitate readout of data stored on tape 12.

Magnetic layer 20 may be deposited on non-magnetic substrate 22 by sputtering, vapor-deposition, or the like. Magnetic layer 20 is deposited on substrate 22 at a thickness, typically between ten and thirty nanometers, that allows transmission of light therethrough. The relatively small thickness of magnetic layer 20 allows magnetic layer 20 to be magnetized virtually to saturation by the fringing magnetic fields associated with data regions in data tracks on tape 12.

As will be described in greater detail below, magnetic layer 20 has a substantially stabilized magnetic domain configuration. Magnetic layer 20 may be patterned, e.g., etched, ablated, imprinted, stamped, or the like, after deposition such that one or more magnetic domains within magnetic layer 20 form in a stabilized configuration. Magnetic layer 20 whose magnetic domain configuration is substantially stabilized in this manner may display a more uniform cross-medium response than magnetic layers of unconstrained magneto-optic read heads. Further, where magnetic layer 20 is formed to include a single predominant domain, the occurrence of Barkhausen noise within the data signal readout by magneto-optic head 14 may be suppressed.

Figure 3:
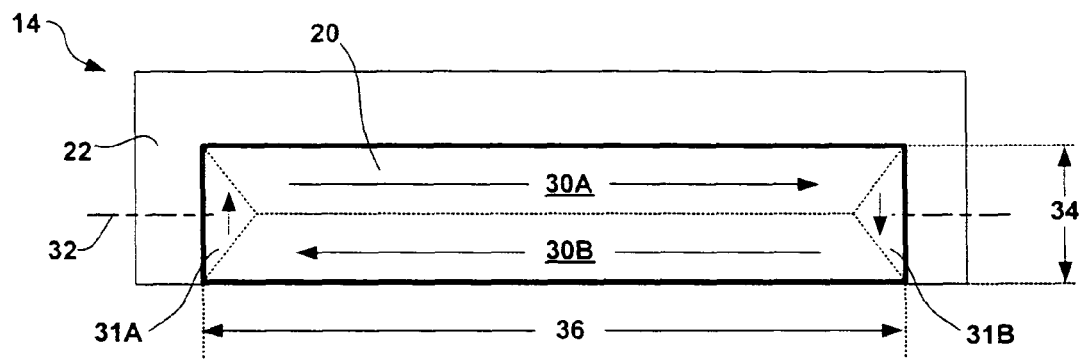
FIG. 3 is a front view illustrating the magnetic layer of the magneto-optic head of FIG. 2 with a substantially stabilized magnetic domain configuration according to the invention.

FIG. 3 is a front view illustrating the substantially stabilized magnetic domain configuration of magnetic layer 20. As shown in FIG. 3, layer 20 includes two predominant magnetic domains, 30A and 30B (collectively, "magnetic domains 30"), which form a set of magnetic domains that are oriented substantially parallel to a major axis 32 of magnetic layer 20. Layer 20 also includes two smaller closure domains 31A and 31B (collectively "closure domains 31"), which together with domains 30 form a substantially closed magnetic flux loop. Magnetic layer 20 is patterned such that a height 34 of layer 20 is less than or equal to twenty micrometers. Layer 20 is further patterned such that an aspect ratio of a width 36 of layer 20 in the direction of major axis 32 to the height 34, i.e., the width-to-height aspect ratio of layer 20, is greater than or equal to 2.

When layer 20 is formed or patterned to such dimensions, magnetic domains 30 and 31 therein tend to arrange themselves in a substantially stabilized configuration, such as the exemplary configuration illustrated in FIG. 3, wherein the predominant domains 30 are oriented substantially parallel to the long-axis 32 of the magnetic layer 20. With the illustrated substantially stable domain configuration, magnetic layer 20 may exhibit a more uniform cross-tape response to fringing magnetic fields, improving the fidelity of data readout by system 10 (FIG. 1). However, due to the presence of multiple magnetic domains 30, magnetic layer 20 is still susceptible to Barkhausen noise, which is caused by motion of the walls between domains 30 during magnetization of magnetic layer 20 by tape 12 (FIGS. 1 and 2).

Figure 4:
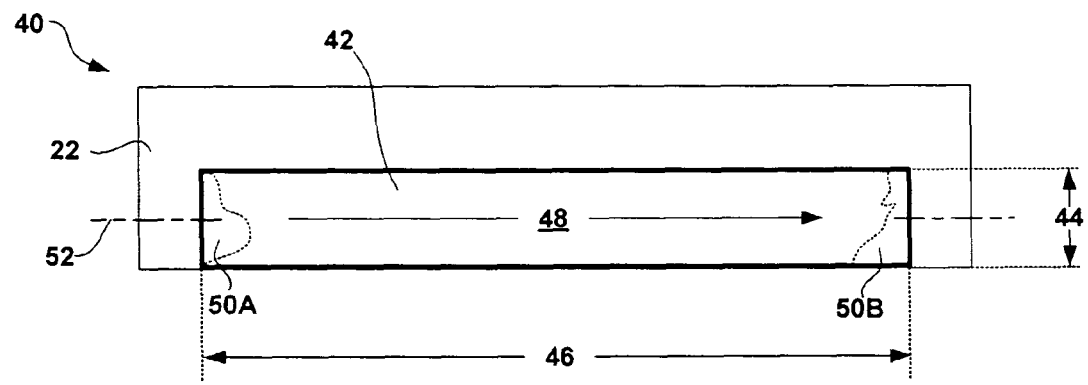
FIGS. 4–7 are front views illustrating additional example magneto-optic heads with magnetic layers having substantially stabilized magnetic domain configurations according to the invention.

FIG. 4 is a front view illustrating another example magneto-optic head 40 that includes a magnetic layer 42 with a substantially stabilized magnetic domain configuration. Magnetic layer 42 is patterned such that a height 44 of layer 42 is less than or equal to five micrometers, and a width 46 to height 44 aspect ratio of layer 42 is greater than or equal to four. When magnetic layer 42 is patterned to such dimensions, a single predominant central magnetic domain 48 with smaller closure domains 50A and 50B (collectively "closure domains 50") located at the ends of layer 42 tend to form therein. In such cases, predominant domain 48 is the single magnetic domain of a set and, as shown in FIG. 4, is oriented substantially parallel with a major axis 52 of layer 42. With the substantially stabilized magnetic domain configuration illustrated in FIG. 4, i.e., a single predominant domain 48, magnetic layer 42 may tend to avoid the occurrence of Barkhausen noise during magnetization.

Figure 5:
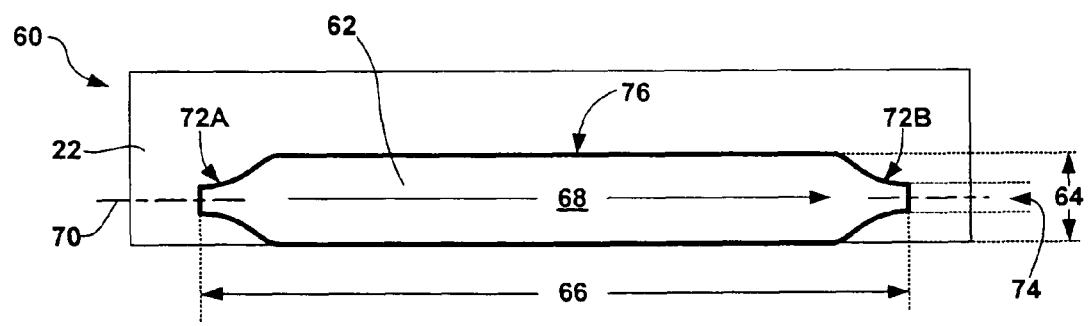

FIG. 5 is a front view illustrating another example magneto-optic head 60 that includes a magnetic layer 62 with a substantially stabilized magnetic domain configuration. Like layer 42 of FIG. 4, layer 62 may be patterned such that a height 64 and widths 66 to height 64 aspect ratio of layer 62 are less than or equal to five micrometers and greater than or equal to four, respectively. Further, like layer 42 of FIG. 4, layer 62 may include a single predominant magnetic domain 68 oriented substantially parallel with a major axis of layer 62.

As shown in FIG. 5, magnetic layer 62 is further patterned at ends 72A and 72B (collectively "ends 72"), which oppose each other along major axis 70. Specifically, ends 72 are patterned such that a height 74 of ends 72 is less than height 64 of a central portion 76 of layer 62, i.e., such that ends 72 are "narrower" than central portion 76. For example, where height 64 is less than or equal five micrometers, height 74 of ends 72 may be between one and two micrometers.

The patterning of ends 72 to be narrower than central portion 76 may further stabilize the magnetic domain configuration within layer 62. For example, narrow ends 72 may confine closure domains 50 (not shown in FIG. 5) therein. The "tapered" shape of ends 72 is merely exemplary, and ends 72 may be patterned in any shape to be narrower than central portion 76.

Figure 6:
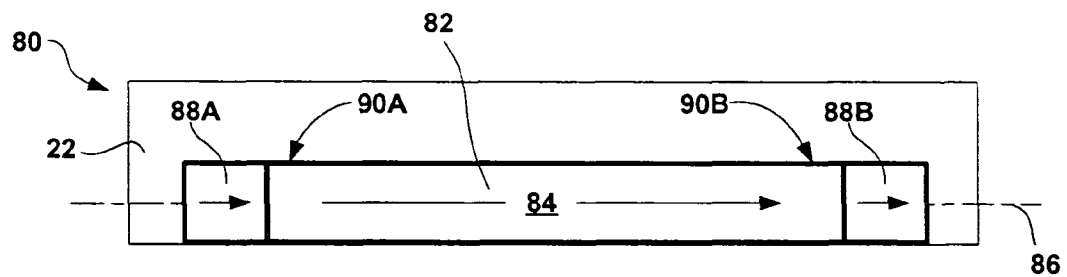

FIG. 6 is a front view illustrating another example magneto-optic head 80 with a magnetic layer 82 having a substantially stabilized magnetic domain configuration. As shown in FIG. 6, layer 82 includes a single magnetic domain 84 oriented substantially parallel with a major axis 86 of layer 82. Although not illustrated in FIG. 6, layer 82 may be patterned to have a height and width-to-height aspect ratio as described above with reference to FIG. 4.

Permanent magnet elements 88A and 88B (collectively "permanent magnet elements 88") are positioned proximate to ends 90A and 90B (collectively "ends 90") of magnetic layer 82. Permanent magnet elements 88 typically comprise a permanent magnetic material such as cobalt-platinum or cobalt-chromium-platinum. In some embodiments, permanent magnet elements 88 are deposited to abut against or overlap ends 90.

The inclusion of permanent magnet elements 88 on magneto-optic read head 80 may stabilize the magnetic domain configuration of magnetic layer 82 by creating demagnetizing fields at ends 90 that are greater than those likely to otherwise be encountered by layer 82. Where permanent magnet elements 88 are included, the product of the remnant magnetization moment and film thickness (Mr*T) of layer 82 and elements 88 should be matched such that the internal magnetic field is continuous at the borders between layer 82 and permanent magnet elements 88. The magnetic fields of magnet elements 88 are set substantially parallel with major axis 86 of magnetic layer 82, as shown in FIG. 6, by exposing magnet elements 88 to a strong magnetic field that is in the direction of major axis 86. The demagnetizing fields provided by permanent magnet elements 88 may eliminate closure domains 50 (not shown in FIG. 6) by providing a continuous magnetic flux boundary at the ends of magnetic layer 82.

The configuration permanent magnet elements 88 illustrated in FIG. 6 is merely exemplary. For example, some magneto-optic head embodiments according to the invention include multiple magnet elements 88 located proximate to each end 90 of magnetic layer 82. In other embodiments, ends of a single permanent magnet element 88 are located proximate to respective ends of magnetic layer 82.

Figure 7:
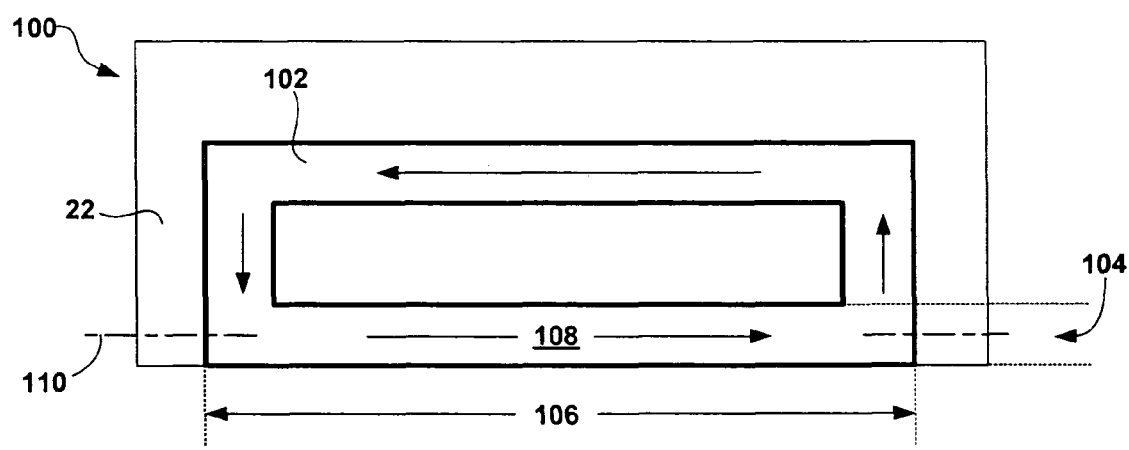

FIG. 7 is a front view illustrating another example magneto-optic head 100 with a magnetic layer 102 having a substantially stabilized magnetic domain configuration. As shown in FIG. 7, magnetic layer 102 is patterned to have a closed-loop shape. Magnetic layer 102 may be patterned to this configuration, for example, by applying photoresist to and etching away an interior portion of the magnetic material deposited on a substrate 22. Alternatively, magnetic layer 102 may be patterned to this configuration through ablation, ion milling, or photolithography lift-off techniques. In any case, the illustrated shape of layer 102 is merely exemplary, and layer 102 may be patterned, for example, into an oval-like shape, a rectangular shape, or even a non-uniform shape.

Magnetic flux is largely contained within closed-loop magnetic layer 102, and closure domains 50 (FIG. 3) do not form in layer 102. Where a height 104 and width 106 to height 104 aspect ratio of layer 102 are constrained as described above with reference to FIG. 4, i.e., less than five micrometers and greater than four, respectively, a single, substantially closed-loop magnetic domain 108 tends to form. Near the bottom of read head 100, where light is directed by light source 16 (FIG. 1), magnetic domain 108 is substantially parallel to a major axis 110 of magnetic layer 102.

Figure 8:
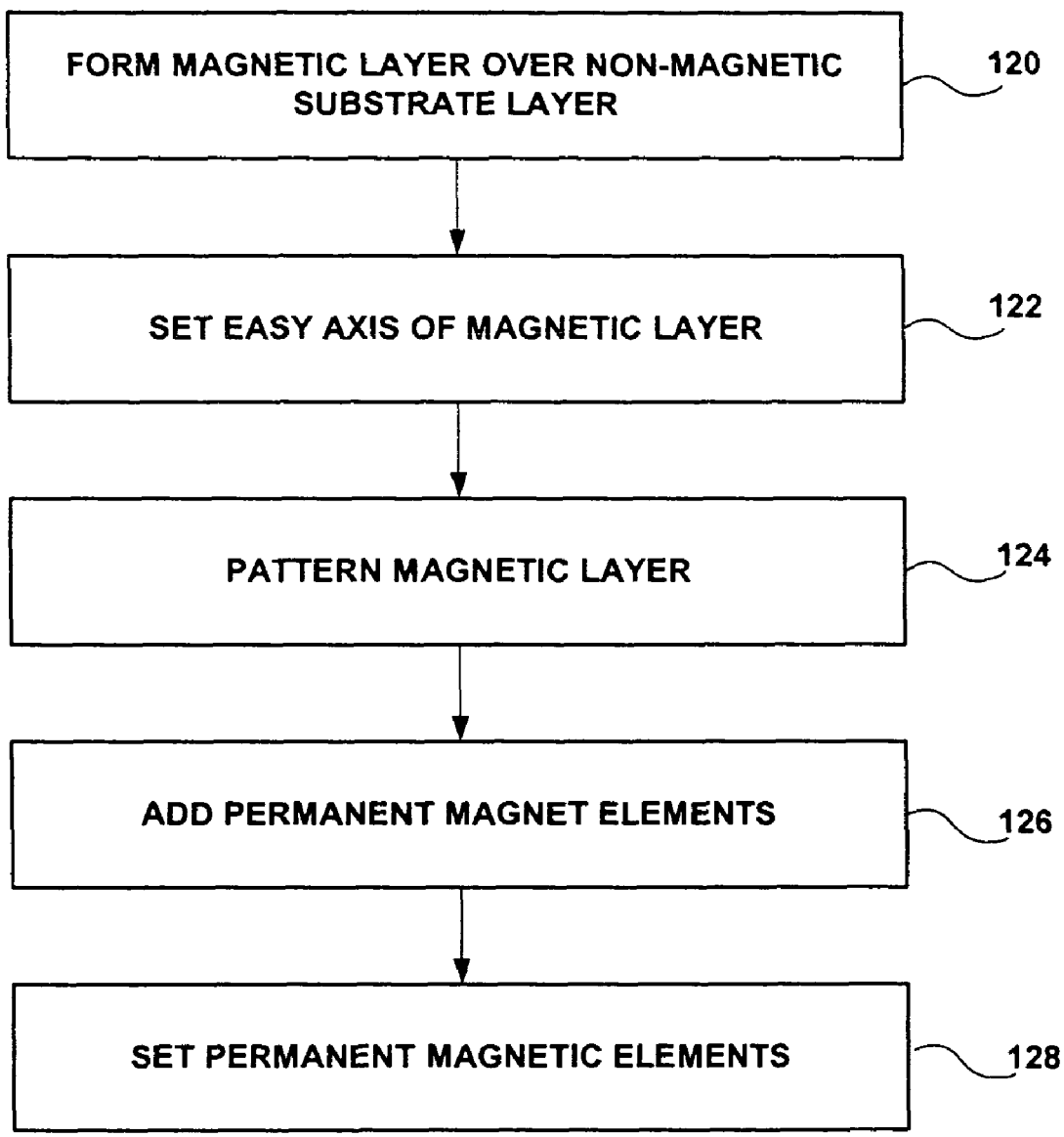
FIG. 8 is a flow diagram illustrating an exemplary method of making a magneto-optic head that includes a magnetic layer having a substantially stabilized magnetic domain configuration according to the invention.

FIG. 8 is a flow diagram illustrating an exemplary method of making a magneto-optic head 12 that includes a magnetic layer 20 having a substantially stabilized magnetic domain configuration according to the invention. The magnetic layer 20 is formed over a non-magnetic substrate layer 22 (120). In exemplary embodiments, a magnetic field is applied during formation of magnetic layer 20 to set an anisotropic easy axis of layer 20 such that it is oriented substantially parallel with a major axis 32 of layer 20 (122). The magnetic layer 20 is then patterned such that one or more magnetic domains 30, which are substantially oriented with the major axis 32 of the layer 20 and consequently also oriented with the easy axis of layer 20, form therein (124). Patterning of the magnetic layer 22 may include etching the layer 22.

As described above, the magnetic layer 22 may be patterned such that a height 34 and width 36 to height 34 aspect ratio of the layer 22 are constrained. The magnetic layer 22 may be further patterned such that ends 72 are narrower than a central portion 76 of the magnetic layer 22. In some embodiments, the magnetic layer 22 is patterned into a closed-loop shape. In some embodiments, one or more permanent magnet elements 88 are positioned at ends of the magnetic layer 22 to further stabilize the magnetic domain configuration (126). In such embodiments, a magnetic field is applied to permanent magnet elements 88 to orient their magnetic fields substantially parallel with major axis 32 of layer 20 (128).

Figure 9A:
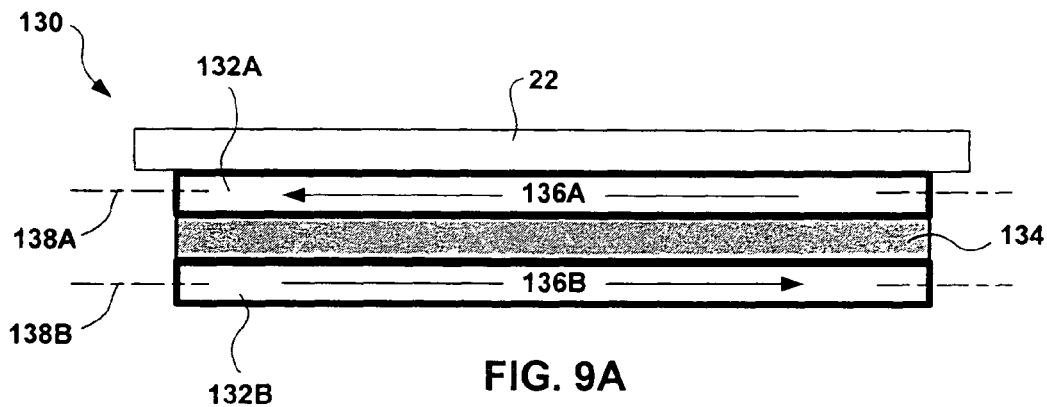
FIG. 9A is a top view illustrating an example magneto-optic head that includes two magnetic layers having substantially stabilized magnetic domain configurations according to the invention.

FIG. 9A is a top view illustrating an example magneto-optic head 130 that includes two magnetic layers 132A and 132B (collectively "magnetic layers 132") having substantially stabilized magnetic domain configurations according to the invention. First magnetic layer 132A is formed over non-magnetic substrate 22 as described above. A second non-magnetic layer 134 is then formed over first magnetic layer 132A, and second magnetic layer 132B is formed over second non-magnetic layer 134. Second non-magnetic layer 134 may comprise a layer of copper that is thin relative to substrate 22. For example, second non-magnetic layer 134 may be less than three nanometers thick in order to ensure magnetic interaction between magnetic layers 132.

Magnetic layers 132 are antiferromagnetically coupled, e.g., the magnetization vectors of layers 132 are anti-parallel and form a closed magnetic circuit. Consequently, as shown in FIG. 9A, magnetic domains 136A and 136B are oriented substantially parallel to major axes 138A and 138B of layers 132A and 132B, respectively. Although not illustrated in FIG. 9A, the heights and width-to-height aspect ratios of layers 132 may be constrained as described above with reference to FIG. 4.

Figure 9B:
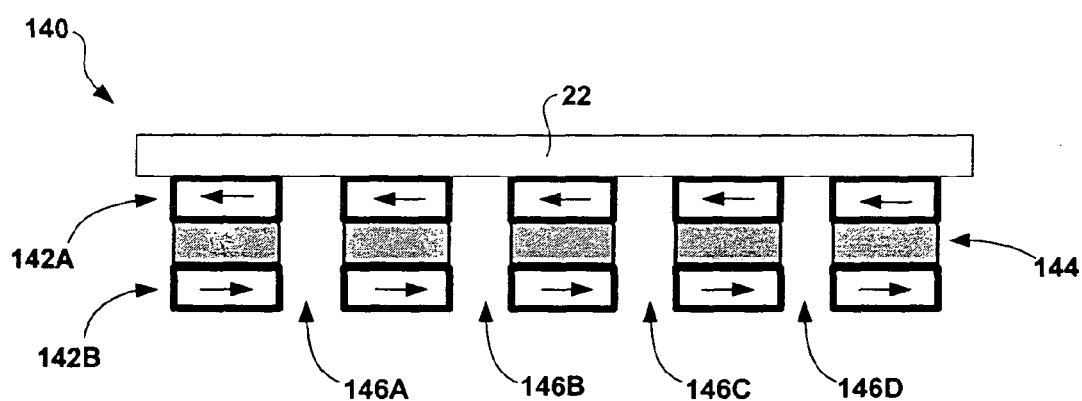
FIG. 9B is a top view illustrating another example magneto-optic head that includes two magnetic layers having substantially stabilized magnetic domain configurations and ferromagnetic exchange breaks within the magnetic layers.

FIG. 9B is a top view illustrating another example magneto-optic head 140 that includes magnetic layers 142A and 142B (collectively "magnetic layers 142") that are antiferromagnetically coupled via a thin non-magnetic layer 144. Layers 142 include ferromagnetic exchange breaks 146A–D (collectively "exchange breaks 146"), which reduce the lateral permeability of magnetic flux through magnetic layers 142. Consequently, exchange breaks 146 reduce crosstalk between adjacent segments of magneto-optic head 140. If adjacent segments of head 140 are positioned over different tracks, exchange breaks 146 ensure that the magnetic fields for the data regions in one track do not corrupt the readout of data regions in adjacent tracks.

In exemplary embodiments, as illustrated in FIG. 9B, ferromagnetic exchange breaks 146 are defined by etching through magnetic layers 142 and non-magnetic layer 144. In such embodiments, a plurality of antiferromagnetically coupled magnetic domain pairs that are oriented substantially parallel to major axes (not shown) of FIG. 9B are formed within the remaining portions of layers 142. In other embodiments, exchange breaks 146 are formed by doping lines through magnetic layers 142, for example, by using ion implantation methods. Additional details regarding exemplary techniques for forming and spacing exchange breaks 146 within a magnetic layer of a magneto-optic read head may be found within commonly-assigned U.S. Pat. No.

6,535,351, entitled "Narrow Track Resolution Magneto-Optic Read Head," which is incorporated herein in its entirety.

Figure 10:
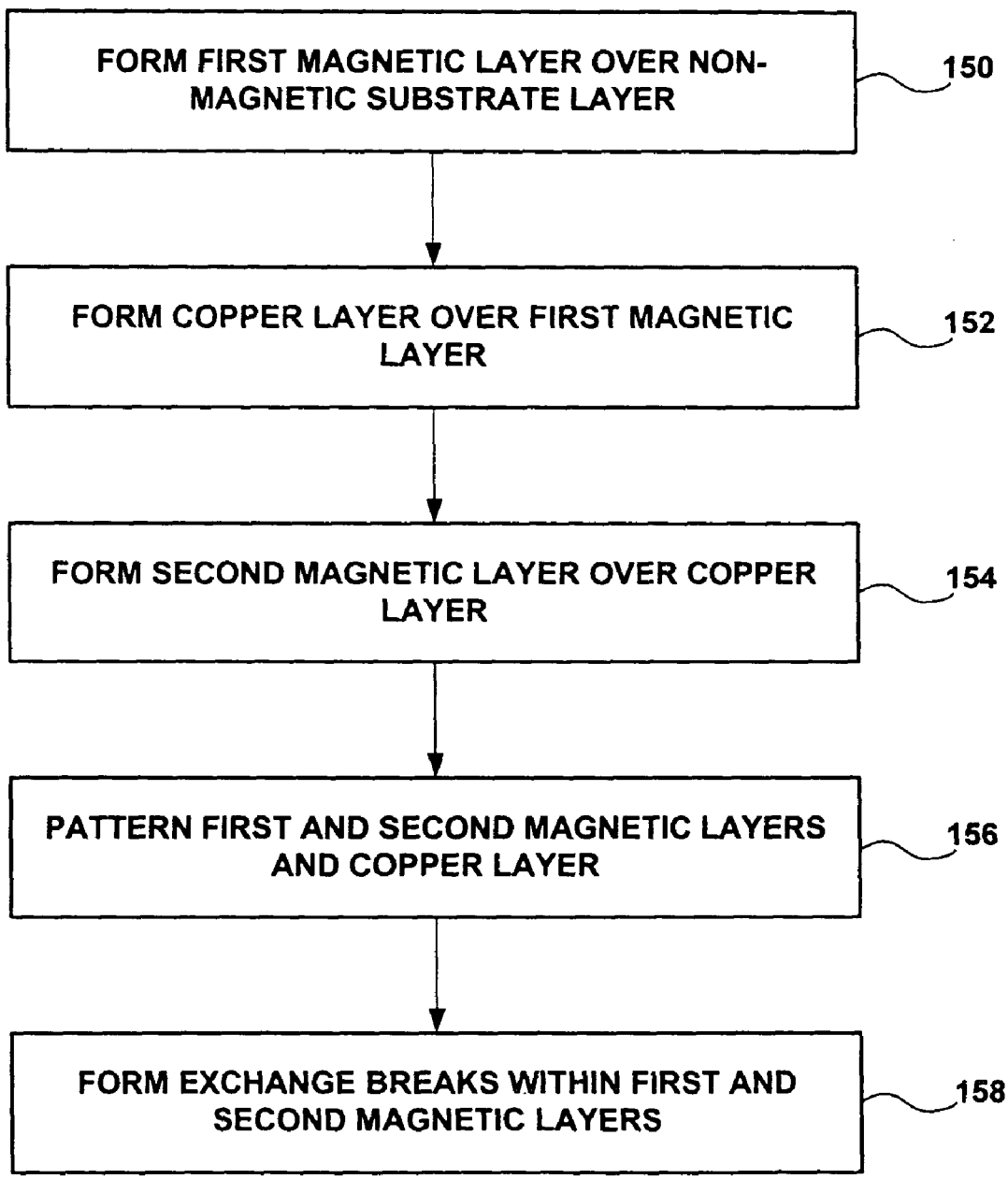
FIG. 10 is a flow diagram illustrating an exemplary method of making a magneto-optic head that includes two magnetic layers having substantially stabilized magnetic domain configurations according to the invention.

FIG. 10 is a flow diagram illustrating an exemplary method of making a magneto-optic read head 140 that includes two magnetic layers 142 having substantially stabilized magnetic domain configurations according to the invention. A first magnetic layer 142A is deposited over a non-magnetic substrate layer 22 as described above (150). A thin non-magnetic layer 144, such as a copper layer, is deposited over the first magnetic layer 142A (152). A second magnetic layer 142B is deposited over the thin non-magnetic layer 144 (154). Depositing of layers 142A, 142B and 144 may be by, for example, sputtering or vapor deposition.

Layers 142A and 142B are antiferromagnetically exchange coupled, and magnetic domains 146 of layers 142 are consequently oriented substantially parallel with major axes 138 of layers 142. In some embodiments, layers 142 are patterned such that heights and width-to-height aspect ratios of layers 142 are constrained as described herein with reference to FIG. 4 (156). In some embodiments, magnetic exchange breaks 146 are formed within layers 142, for example by etching through layers 142 and 144 (158).

A number of embodiments of the invention have been described. For example, a magneto-optic head including a magnetic layer having a substantially stabilized magnetic domain configuration has been described. Techniques for making such a head, such as by patterning the magnetic layer to constrain the magnetic domain configuration, have also been described.

Nevertheless, various modifications may be made to various aspects of this disclosure without departing from the scope of the invention. For example, the various layers of the head may have any thickness, and may be made of any material appropriate for the purposes described herein. Further, although layers are depicted herein as deposited directly on top of each other, a magnetic read head according to the invention may include layers deposited between the described layers. Moreover, although depicted herein primarily as including a single magnetic layer with a stabilized magnetic domain configuration, magneto-optic heads according to the invention can include any number of magnetic layers with magnetic domain configurations that are stabilized as described herein.

Although magnetic layers have been described herein as patterned to specified dimensions and/or shapes, the invention is not so limited. In some embodiments, magnetic layers are formed, e.g., deposited, in the desired dimensions and/or shapes.

Nor is the invention limited to embodiments where the major axis of a magnetic layer is, as has been depicted herein, oriented parallel to the plane of a medium. Although this orientation is preferred, the major axis of the medium may be oriented in any direction. For example, in some embodiments, the major axis of a magnetic layer can be oriented so that it is perpendicular to both the plane medium and the motion of the medium relative to the magneto-optic head. These and other embodiments are within the scope of the following claims.

The invention claimed is:

1. A magneto-optic system comprising:
    a magneto-optic head including a non-magnetic substrate layer, and a magnetic layer formed over the substrate layer that includes a set of magnetic domains, each magnetic domain of the set oriented substantially parallel with a major axis of the magnetic layer;
    a light source that illuminates the magnetic layer; and
    a light detector that detects light reflected off the magnetic layer.

2. The magneto-optic system of claim 1, wherein a height of the magnetic layer of the magneto-optic head is less than or equal to five micrometers, and the width-to-height aspect ratio is greater than or equal to four.

3. The magneto-optic system of claim 1, wherein the magnetic layer of the magneto-optic head includes a central portion and first and second opposing ends oriented along a major axis of the magnetic layer, and a height of the ends is less than a height of the central portion.

4. The magneto-optic system of claim 3, wherein the height of the central portion is less than or equal to five micrometers and the height of the ends is less than or equal to two micrometers.

5. The magneto-optic system of claim 1, wherein a height of the magnetic layer is less tan or equal to twenty micrometers.

6. The magneto-optic system of claim 1, wherein a width-to-height aspect ratio of the magnetic layer is greater than or equal to two.

7. The magneto-optic system of claim 1, wherein the magneto-optic head further includes first and second permanent magnet elements, wherein the magnetic layer includes first and second opposing ends oriented along the major axis, the first permanent magnet element is located substantially proximate to the first end of the magnetic layer, and the second permanent magnet element is located substantially proximate to the second end of the magnetic layer.

8. The magneto-optic system of claim 1, wherein the magnetic layer is configured as a closed-loop and includes a single substantially closed-loop magnetic domain.

9. The magneto-optic system of claim 1, wherein the substrate layer comprises a first non-magnetic layer, and the magnetic layer comprises a first magnetic layer, the magneto-optic head further including:
    a second non-magnetic layer formed over the first magnetic layer; and
    a second magnetic layer formed over the second non-magnetic layer, the second magnetic layer including at least one magnetic domain oriented substantially parallel to a major axis of the second magnetic layer.

10. The magneto-optic system of claim 9, wherein the first and second magnetic layers include a series of ferromagnetic exchange breaks that reduce lateral permeability of magnetic flux through the first and second magnetic layers.

11. The magneto-optic system of claim 1, wherein the set of magnetic domains comprises a single magnetic domain.

12. The magneto-optic system of claim 1, wherein each magnetic domain of the set is oriented substantially parallel to an easy axis of the magnetic layer.

13. The magneto-optic system of claim 1, wherein a height of the magnetic layer is less than or equal to twenty micrometers, and a width-to-height aspect ratio of the magnetic layer is greater than or equal to two.

* * * * *